Figure 1:
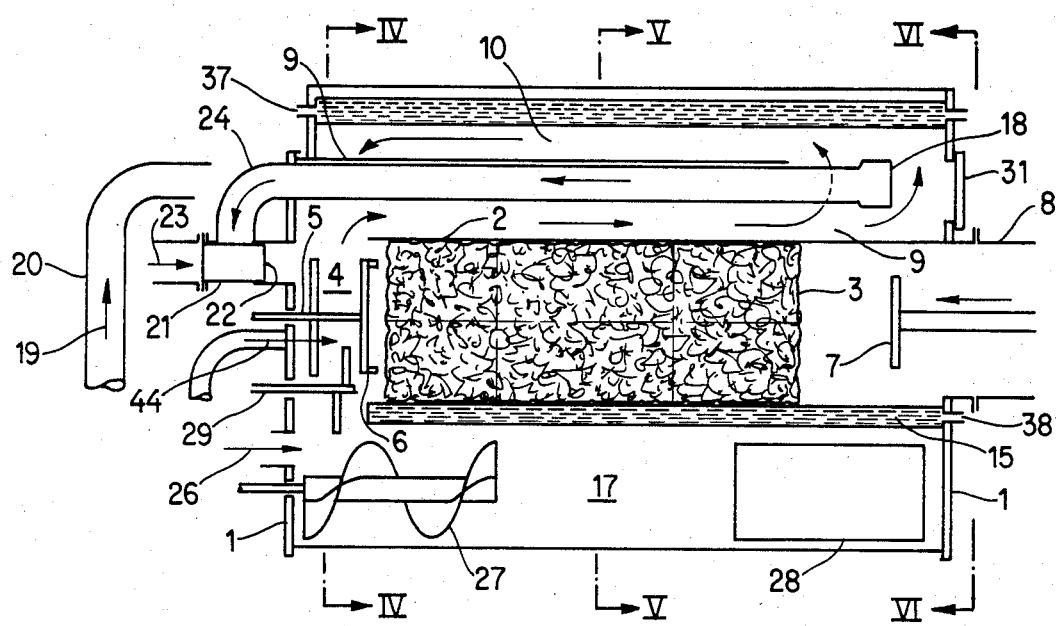

United States Patent [19]

Bollmann, Sr. et al.

[11] Patent Number: 4,732,090
[45] Date of Patent: Mar. 22, 1988

[54] HEATING FURNACE FOR RECOVERY OF ENERGY FROM COMPACTED PAPER, STRAW AND LIKE FUELS

[76] Inventors: Heinrich Bollmann, Sr.; Heinrich Bollmann, Jr., both of Woltwiescher Strasse 17, D-3201 Söhlde, Fed. Rep. of Germany

[21] Appl. No.: 852,959
[22] PCT Filed: Jun. 28, 1985
[86] PCT No.: PCT/DE85/00220
 § 371 Date: May 1, 1986
 § 102(e) Date: May 1, 1986
[87] PCT Pub. No.: WO86/00390
 PCT Pub. Date: Jan. 16, 1986

[30] Foreign Application Priority Data
 Jun. 30, 1984 [DE] Fed. Rep. of Germany ....... 3424193

[51] Int. Cl.$^4$ .......................... F23B 1/28; F23B 1/38
[52] U.S. Cl. ................................. 110/196; 110/234; 110/259
[58] Field of Search ............... 110/196, 102, 234, 259, 110/293; 236/14; 122/448 R, 504

[56] References Cited

U.S. PATENT DOCUMENTS

| | | | |
|---|---|---|---|
| Re. 29,502 | 12/1977 | Jarunko et al. | 110/259 X |
| 2,742,881 | 4/1956 | Rideout et al. | 122/504 X |
| 4,102,279 | 7/1978 | Groschl et al. | 110/293 X |
| 4,598,648 | 7/1986 | D'Angelo | 236/14 X |

FOREIGN PATENT DOCUMENTS

| | | |
|---|---|---|
| 580302 | 6/1933 | Fed. Rep. of Germany . |
| 3017384 | 11/1981 | Fed. Rep. of Germany ...... 110/196 |
| 3126419 | 1/1983 | Fed. Rep. of Germany . |
| 1013510 | 7/1952 | France . |
| 2031686 | 11/1970 | France . |
| 2290637 | 6/1976 | France . |
| 2492504 | 3/1982 | France . |
| 2490320 | 3/1982 | France . |

Primary Examiner—Edward G. Favors
Attorney, Agent, or Firm—Peter K. Kontler

[57] ABSTRACT

Heating boiler intended to be used for burning straw, paper and similar fuel material in the form of compressed bales. The boiler is capable of supplying the material to be burned as a function of the heat requirements. It is necessary to provide optimum combustion conditions to maintain exhaust gas emission values within prescribed limits. The boiler is therefore provided inside its combustion compartment with a channel (2) wherein the compressed bales are dried and the slow distillation gas is removed to a large extent from the fuel. The bale supply channel (2) opens into a combustion chamber (4) enclosing the combustion compartment and preventing the flames from touching the water jacket (15) of the boiler.

24 Claims, 8 Drawing Figures

HEATING FURNACE FOR RECOVERY OF ENERGY FROM COMPACTED PAPER, STRAW AND LIKE FUELS

Heating furnace, with a fuel supplying opening located in a vertical plane, which serves to recover heat from straw, paper and like combustible material supplied in the form of highly compressed bales which are subjected to a continuous advancing force, and wherein a bale abutment is provided in the combustion chamber in conjunction with a device which penetrates into the bale and serves to loosen that quantity of fuel which is supplied for combustion and corresponds to the quantity of heat to be generated.

Heretofore, recovery of heat from straw has remained economically insignificant due to difficulties which are associated with the combustion of straw in heating plants. The high content of volatile constituents is especially problematic in connection with the combustion of straw. Reference is being had to those constituents which are released, with the exclusion of oxygen, as a result of heating above 300° C. but are combusted only above 600° C.

With 65% of air-dried substance, straw exhibits the absolute maximum share of such substance, and this is also the greatest problem in connection with the combustion of such fuel. In an oven construction wherein the entire introduced fuel comes to a glow within a short period of time, i.e., simultaneously, 80% of combustible substances are released in the form of gas within a few minutes after the temperature exceeds 300° C. Due to necessary limitations of the output of the furnace in the partial load range, either the combustion is incomplete with attendant unsatisfactory efficiency and high emission values as concerns dust, soot and tar, or the combustion chamber can be filled at any given time with straw only to a small fraction of its capacity, and the straw must be replaced immediately upon combustion of the small quantity corresponding to the desired partial output. However, a continuous combustion such a manner is not possible.

The object underlying the invention is to provide a heating furnace with arrangements for automatic regulation of heat requirements from full load to partial loads while maintaining optimal combustion conditions with an optimal formation of flames and the combustion of all combustible substances. As a result of separation of fly ash within the furnace, the emission values should not exceed the prescribed limit values. Furthermore, it should be possible not only to utilize the heat of the volatile gaseous constituents but also that of the solid residues up to their complete combustion.

The solution in accordance with the invention is characterized in that the highly compressed bales which are to be supplied to the combustion chamber are surrounded by channel walls within the furnace. Such walls end ahead of the combustion chamber, i.e., they extend to the combustion chamber which is preferably disposed in the interior of a chamber serving to insulate the flames from the water jacket of the furnace.

The length of the channel for compressed bales is determined by the interval of time which is required for complete drying of the fuel and for the generation of carbonization gases. In order to ensure an optimum formation of the flames, the combustion chamber discharges into a flame channel which is disposed above the bale channel and extends substantially along the full length of the heating furnace. At the end of the flame channel, waste gases can first be deflected into an upper flue, which occupies the upper part of the space within the furnace, to be introduced into two additional flues after having passed through the upper flue. The additional flues are disposed at both sides of the bale channel and are thus located at a level below the upper flue. Due to the fact that their cross-sectional areas increase relative to the flame duct, the flues constitute quieting-down zones to thus effect total combustion.

In accordance with a further advantageous development of the subject matter of the invention, it is proposed to make the bale abutment as a circumferentially complete ring whose side facing the compressed bale is provided with at least two studs which penetrate into the fuel. It is preferred to provide, in an ash box which is disposed below the combustion chamber and the water jacket, a feed screw with the assistance from which all still combustible constituents of the fuel which have already descended into the ash box are loosened to be thus capable of undergoing complete combustion. The thus developing heat can rise upwardly and be transmitted to the water jackets of the heating furnace.

The heating furnace which is constructed in accordance with the invention renders it possible to recover heat from straw, paper and like combustible material while adhering to the prescribed limits for the emission of waste gases, namely not only for a particular load range but all the way from full load down to very small partial loads, without a deterioration of combustion and without the emission of soot and combusted carbonization gases, fly ash and tar exceeding the unacceptable limits. Fuel is heated in the furnace already prior to its combustion. In this manner, the material is fully dried and is carbonized to a large extent. Consequently, only minimal quantities of carbonization gases can be generated during the periods of idleness. Fully dried fuel is excellently suited for reignition so that a very rapid flame formation can take place. Another advantage is attributable to the placing of the combustion chamber centrally of the furnace to thus prevent the establishment of contact between the walls of the heat exchanger and the flames (so-called dry combustion chamber). Due to correspondingly low radiation losses, one achieves an optimum combustion chamber temperature, and such temperature can be maintained in conjunction with a thermostat which is provided for this purpose.

The assembly can be effected by utilizing commercially available parts so that, on the whole, one achieves an economical construction.

Additional features which contribute to the advantages of the subject matter of the invention are to be found in the following description of a preferred embodiment.

The drawing shows one embodiment of the subject matter of the invention which is explained hereinafter.

Figure 2:
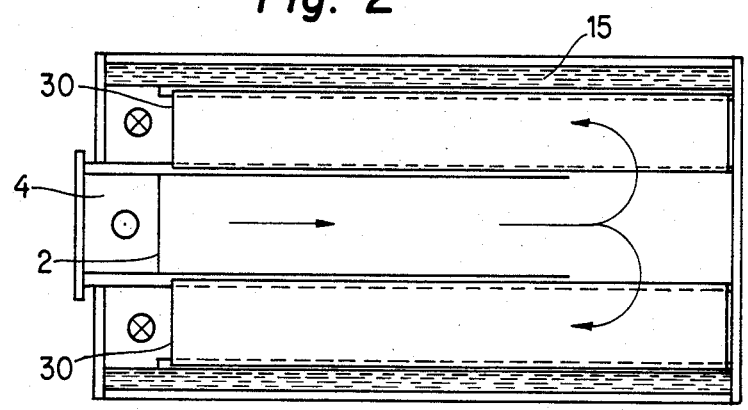
Figure 3:
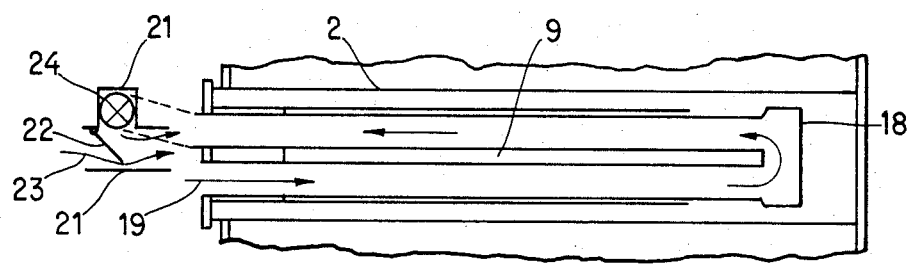
Figure 5:
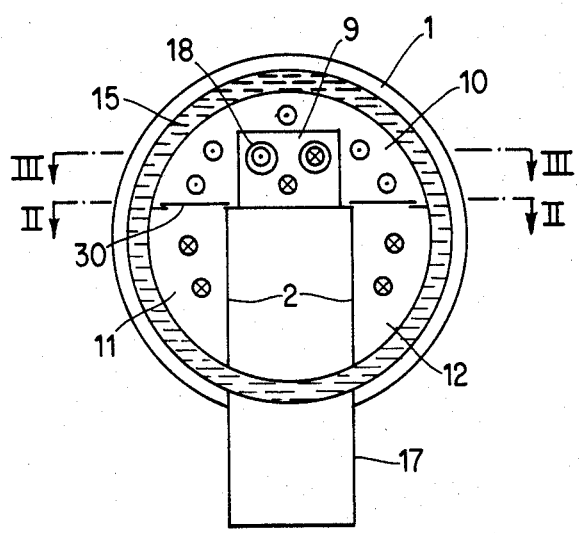
Figure 6:
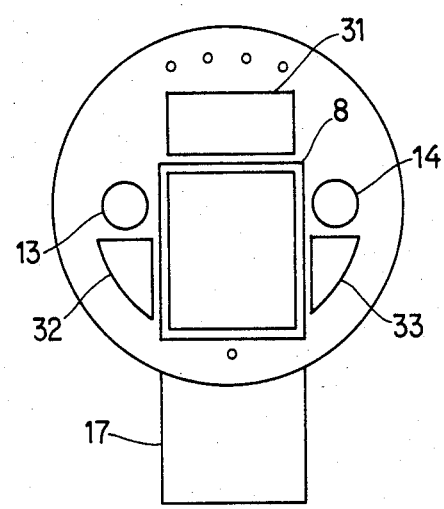
Figure 4:
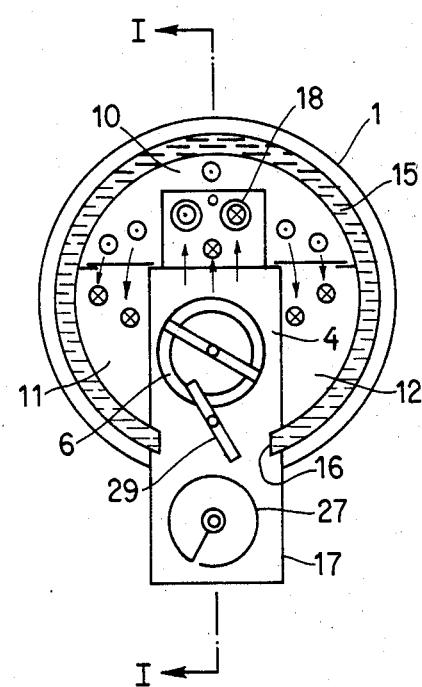
Figure 7:
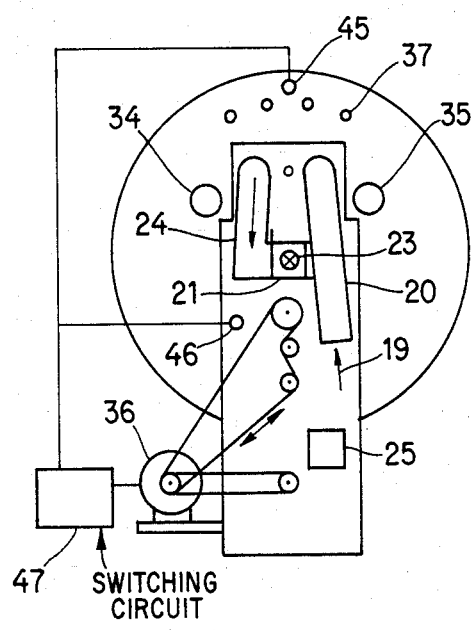
Figure 8:
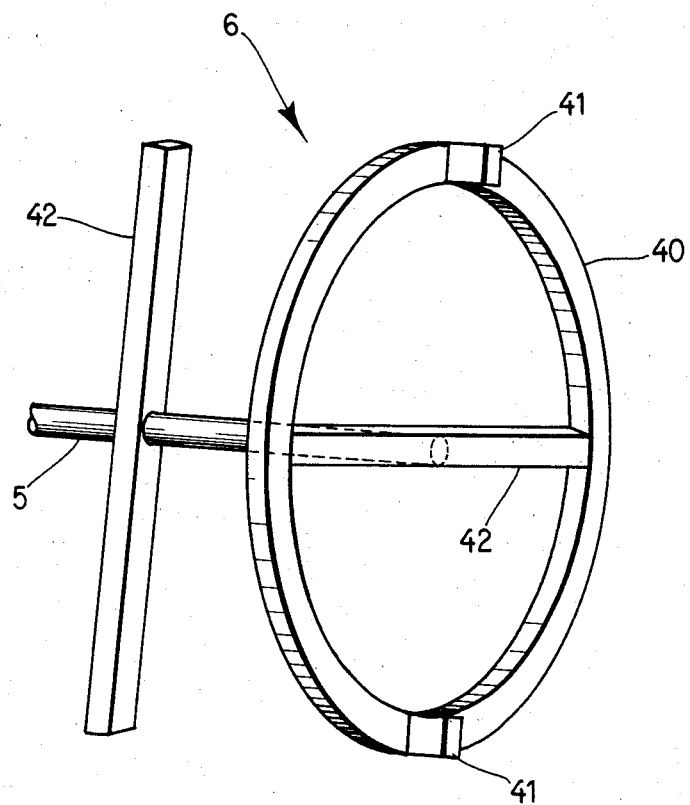

FIG. 1 is a vertical longitudinal section through the heating furnace in the plane 1-1 of FIG. 4, FIG. 2 is a horizontal longitudinal section through the heating furnace above the combustion chamber in the plane II—II of FIG. 5, FIG. 3 is a horizontal longitudinal section through the heating furnace at the level of the air preheater in the plane III—III of FIG. 5, FIG. 4 is a cross section through the heating furnace in the region of the combustion chamber in the plane IV—IV of FIG. 1, FIG. 5 is a cross section through the center of the furnace in the plane V—V of FIG. 1, FIG. 6 is a cross section through the bale supplying channel outside of the furnace in the plane VI—VI of FIG. 1, FIG. 7 shows the front side of the heating furnace, and FIG. 8 is a perspective view of the bale abutment.

The furnace of the illustrate embodiment has a circular cross section. Its outer walls are surrounded by insulating material 1. Its inner space is covered, practically along its full length, by channel walls 2. The thus surrounded internal space serves for reception of highly compressed bales 3, in the illustrated example from straw. The channel walls 2 terminate in front of the combustion chamber 4 into which extends a shaft 5 with a bale abutment 6 against which the bale is pressed by a bale advancing plate 7. The channel walls 2 continue at the outside in the form of a bale feeding channel 8.

Above the combustion chamber 4, there begins the flame channel 9 which extends along the full length of the furnace space above the channel walls 2.

It merges into the upper flue 10 which is followed by two lower flues 11 and 12 at the two sides of the channel walls 2. They terminate at two waste gas tube openings 13 and 14 at the rear end of the furnace at both sides of the bale supplying channel 8.

The flues 10, 11 and 12 and the elements which are disposed therein are surrounded by a water jacket 15 which has a cutout 16 in the region of the combustion chamber 4 in order to enable the residues of combusted fuel to pass into the ash box 17 which is disposed therebelow.

In the illustrated example, air preheating pipes 18 are disposed in the flame channel 9 to receive secondary air 19 which is preheated in a pipe 20 and can be mixed with fresh air 23 in a mixing box 21 having an adjustable mixing flap 22. The connecting pipe between the air preheater 18 and the mixing box 21 is denoted by 24. Primary air 26 is admitted below the combustion chamber 4 at the level of the ash box 17 by way of an opening 25. However, preheating of secondary air in an air preheater is not necessary in each instance because secondary air which reaches the combustion chamber after having passed through the bale channel 8 is already preheated. In addition, it is possible to guide primary air into the combustion chamber along the full length of the ash box. In this manner, primary air withdraws substantial quantities of heat from the glowing ash and reaches the combustion chamber in preheated condition.

A transporting feed screw 27 is installed in the front part of the ash box below the combustion chamber 4 in order to first loosen the descending fuel material and to compact it thereafter. The loosening allows for a complete secondary combustion of non-combusted residues whose heat is transmitted to the lower region of the water jacket 15.

The character 28 denotes a withdrawing flap for ashes. In addition, a rod-shaped disintegrator 29 which is provided above the feed screw 27 is capable of continuously maintaining the space for descent of the combusted material unobstructed.

The upper flue 10 is separated from the two lower flues 11 and 12 by sheet metal plates 30. A cleaning flap 31 for withdrawal of fly ash from the upper flue is provided in the rear region of the furnace. In addition, there are provided two cleaning flaps 32 and 33 for the lower flues. The front region of the furnace is accessible through cleaning openings 34 and 35.

Not only the bale abutment 6 but also the feed screw 27 in the ash box and the disintegrating arrangement 29 can be driven by a common motor 36. The motor is reversible so that the bale abutment can be driven in opposite directions in order to increase its efficiency. However, since the feed screw for ashes has to rotate in a single direction only, it is preferably equipped with a freewheel that acts in a single direction.

Water which is heated in the water jacket leaves the furnace by way of a forward flow connection 37 and returns thereinto, for example, after having passed through room heat exchangers, by way of a return flow nipple 38.

Additional openings for thermometers, a means for ensuring the desired heating sequence and sensors for such means are provided at the rear end of the furnace. The front end face of the furnace is provided with openings for attachment of thermostats and for means for ensuring a proper heating sequence.

In order to combust the bale 3 of straw, it is pressed against the ring 40 of the bale abutment 6 by the pressure plate 7. At such time, the studs 41 penetrate into the combustible material. Due to rotary movement of the ring, the material at the front side of the bale is loosened, partially extracted and combusted whereby the flames extend into the flame channel 9 and are not constricted by the latter. Not only the drive shaft 5 but also the ring 40 of the bale abutment 6 are provided with rod-shaped elements 42 for breaking up the remnants of combustion. Due to its deflection, waste gas flows into the upper flue 10 and thereby transmits its energy to the upper half of the water jacket. Waste gases are deflected again at the front end of the furnace and at both sides of the combustion chamber 4 and follow the two flues 11 and 12 all the way to the waste gas openings 13 and 14 through which they leave the furnace and are admitted into the chimney. Additional heat energy is transmitted to the lower half of the water jacket during flow through the lower flues.

Nearly all of the fly ash which contained in the waste gas is deposited in the region of deflection of the waste gas, i.e., in the region of transition from the flame channel 9 into the upper flue 10. It can be readily withdrawn upon opening the cleaning flap 31. The remnants of fly ash deposit in the lower flues 11 and 12 and can also be readily withdrawn from time to time.

The material which descends from the combustion chamber 4, and some of which is not completely combusted, is loosened in the ash box by the feed screw 27 and can be completely combusted in this region primarily under the action of fresh air 26 which enters at this point whereby the combusted material transmits its remaining heat energy to the underside of the heating jacket 15.

The completely combusted particles of ash are thereafter condensed by the feed screw 27 and are pushed into the region of the withdrawing flap 28.

In order to safeguard the furnace, there is provided a thermostat 45 for boiler water and a thermostat 46 for the combustion chamber. The combustion chamber thermostat 46 ensures the optimum combustion temperature of about 700° C. In this manner, one can ensure substantial compliance with the prescribed emission values within the temperature limits which are imposed by the water thermostat 45. For example, the thermostat 45 arrests the motor 36 via a switching circuit 47 when the water temperature reaches the threshold value of 80° C., also in those instances when the combustion chamber thermostat 46 is yet to transmit a stop signal. The flames are extinguished as a result of stoppage of the bale abutment so that only a layer of glowing fuel remains which, however, does not lead to the generation of carbonization gases because the carbonization gas is nearly completely withdrawn from the material already in that region of the straw bale which faces the combustion chamber. Consequently, the maximum permissible values of carbon monoxide emission are not exceeded, not even during the intervals of idleness. As soon as the water thermostat restarts the motor subsequent to a corresponding cooling of the water jacket by a few degrees, a flame develops again at the front side of the straw bale due to a resumption of loosening of the combustible material. Complete drying of combustible material contributes to such formation of flames.

It has been found to be particularly advantageous to admit a part of the combustion air in the form of a bundled jet, for example, by way of a nozzle 44 which is disposed in the front wall of the combustion chamber and is directed against that front end face of the bale which faces the combustion chamber so that the admitted air acts only upon a restricted area of the front face.

Admission of the air stream takes place only during operation of the bale abutment, i.e., it is interrupted simultaneously with each intermittent stoppage of the abutment and is restarted at the required time together with starting of the abutment. In this manner, the heating-up phases which are required to reach the combustion chamber temperature are shortened considerably, and the limits of emission values are reached much more rapidly.

We claim:

1. A furnace for combustion of bales of compressed paper, straw and like combustible materials, comprising walls defining an elongated channel having a first end for admission of bales and a second end; a combustion chamber adjacent to said second end; means for advancing the bales in said channel toward and into said chamber; and means for heating said walls from the outside so as to heat the bales in said channel on their way into said chamber, said heating means comprising a duct which conveys flames and combustion products and extends from said combustion chamber, above said channel and toward said first end, a first flue arranged to receive combustion products from said duct and extending above said channel from the first toward the second end thereof, and additional flues receiving combustion products from said first flue and extending along the sides of said channel.

2. A furnace for combustion of bales of compressed paper, straw and like combustible materials, comprising walls defining an elongated channel having a first end for admission of bales and a second end; a combustion chamber adjacent to said second end; means for advancing the bales in said channel toward and into said chamber; means for heating said walls from the outside so as to heat the bales in said channel on their way into said chamber; a receptacle for solid residues of combustible material, said receptacle being disposed below said channel and extending from said second end toward and at least close at said first end; and means for loosening the residues in said receptacle to promote secondary combustion of combustible ingredients of the residues, and for thereupon compacting the residues.

3. A furnace for combustion of bales of compressed paper, straw and like combustible materials, comprising walls defining an elongated channel having a first end for admission of bales and a second end; a combustion chamber adjacent to said second end; means for advancing the bales in said channel toward and into said chamber; means for heating said walls from the outside so as to heat the bales in said channel on their way into said chamber; a mobile abutment provided in said chamber in the path of advancement of bales from said channel, said abutment comprising an annular portion and a wiper disposed within said annular portion; and means for rotating said annular portion so that said wiper removes residues of combustible material from the bale which is being combusted in said chamber.

4. A furnace for combustion of bales of compressed paper, straw and like combustible materials, comprising walls defining an elongated channel having a first end for admission of bales and a second end; a combustion chamber adjacent to said second end; means for advancing the bales in said channel toward and into said chamber; means for heating said walls from the outside so as to heat the bales in said channel on their way into said chamber; and a mobile abutment provided in said chamber in the path of advancement of bales from said channel, said abutment comprising an annular portion having at least two protuberances extending into the bale which is being combusted in said chamber.

5. A furnace for combustion of bales of compressed paper, straw and like combustible materials, comprising walls defining an elongated channel having a first end for admission of bales and a second end; a combustion chamber adjacent to said second end; means for advancing the bales in said channel toward and into said chamber; means for heating said walls from the outside so as to heat the bales in said channel on their way into said chamber; a mobile abutment provided in said chamber in the path of advancement of bales from said channel, said abutment comprising an annular portion, a shaft for said annular portion, and means provided on said shaft for comminuting solid residues of combusted material in said chamber; and means for rotating said shaft.

6. A furnace for combustion of bales of compressed paper, straw and like combustible materials, comprising walls defining an elongated channel having a first end for admission of bales and a second end; a combustion chamber adjacent to said second end; means for advancing the bales in said channel toward and into said chamber; means for heating said walls from the outside so as to heat the bales in said channel on their way into said chamber; a rotary abutment provided in said combustion chamber in the path of oncoming bales; a receptacle arranged to receive solid residues of combusted material from said combustion chamber, said receptacle being disposed below said channel; a rotary loosening device for solid residues in said receptacle; and common prime mover means for said abutment and said loosening device.

7. A furnace for combustion of bales of compressed paper, straw and like combustible materials, comprising walls defining an elongated channel having a first end for admission of bales and a second end; a combustion chamber adjacent to said second end; means for advancing the bales in said channel toward and into said chamber; means for heating said walls from the outside so as to heat the bales in said channel on their way into said chamber; a receptacle arranged to receive solid residues of combusted material from said chamber, said receptacle being disposed below said channel; a rotary loosening device for solid residues in said receptacle; a reversible motor for said device; and a freewheel interposed between said motor and said device so that the motor can rotate said device in a single direction.

8. A furnace for combustion of bales of compressed paper, straw and like combustible materials, comprising walls defining an elongated channel having a first end for admission of bales and a second end; a combustion chamber adjacent to said second end; means for advancing the bales in said channel toward and into said chamber; and means for heating said walls from the outside so as to heat the bales in said channel on their way into said chamber, said heating means comprising a first flue for combustion products and two additional flues for combustion products, said first flue being disposed at a level above said channel and said additional flues flanking said channel, and said heating means further comprising partitions interposed between said first flue and said additional flues.

9. A furnace for combustion of bales of compressed paper, straw and like combustible materials, comprising walls defining an elongated channel having a first end for admission of bales and a second end; a combustion chamber adjacent to said second end; means for advancing the bales in said channel toward and into said chamber; means for heating said walls from the outside so as to heat the bales in said channel on their way into said chamber, said heating means comprising a duct which conveys flames and combustion products and extends from said chamber and above said channel from said first toward said second end of said channel, and a flue having an intake end communicating with said duct in the region of the first end of said channel; and a door provided in said heating means at said intake end to afford access to the interior of said duct and said flue.

10. A furnace for combustion of bales of compressed paper, straw and like combustible materials, comprising walls defining an elongated channel having a first end for admission of bales and a second end; a combustion chamber adjacent to said second end; means for advancing the bales in said channel toward and into said chamber; means for heating said walls from the outside so as to heat the bales in said channel on their way into said chamber; and means for directing at least one jet of air against the fron side of the bale which is being combusted in said chamber.

11. The furnace of claim 8, further comprising a water jacket at least partially surrounding said combustion chamber, said heating means having means for insulating said jacket from the flames which develop on combustion of bales in said chamber.

12. The furnace of claim 8 for combustion of bales which contain moisture at the time of admission into said channel, wherein the length of said channel, the speed at which the bales are advanced in said channel and the action of said heating means are such that the bales are relieved of moisture and complete the generation of carbonization gases not later than at the time of entry into said combustion chamber.

13. The furnace of claim 8, further comprising a receptacle for solid residues of combustible material, said receptacle being disposed below said channel and extending from said second end toward and at least close to said first end.

14. The furnace of claim 8, further comprising a mobile abutment provided in said chamber in the path of advancement of bales from said channel.

15. The furnace of claim 14, wherein said abutment comprises a rotary member, and further comprising reversible motor means for said rotary member.

16. The furnace of claim 8, further comprising signal generating means for monitoring the temperature in said combustion chamber.

17. The furnace of claim 16, further comprising a water jacket at least partially surrounding said chamber, and signal generating means for monitoring the temperature in said water jacket.

18. The furnace of claim 17, further comprising means for interrupting the combustion in said chamber in response to signals from said monitoring means when the temperature in said jacket reaches a first predetermined value and when the temperature in said chamber reaches a higher second predetermined value.

19. The furnace of claim 8, wherein said heating means comprises a duct which conveys flames and combustion products from said chamber and extends at a level above and along the full length of said channel.

20. The furnace of claim 8, further comprising a receptacle having an inlet arranged to receive solid residues of combusted material from said chamber by gravity feed and means for agitating the residues in the region of said inlet.

21. The apparatus of claim 8, wherein said heating means comprises a duct which conveys flames and combustion products from said chamber and means for supplying air to said chamber including means for preheating the air, said preheating means being disposed in said duct.

22. The furnace of claim 21, wherein said supplying means further comprises means for mixing preheated air with cooler atmospheric air.

23. The furnace of claim 8, further comprising a substantially cylindrical housing for said walls, said heating means and said combustion chamber.

24. The furnace of claim 10, wherein said directing means comprises a nozzle which is installed in said chamber substantially opposite the second end of said channel.

* * * * *